US012272257B2

(12) United States Patent
Chik (10) Patent No.: US 12,272,257 B2
(45) Date of Patent: Apr. 8, 2025

(54) SYSTEMS AND METHODS FOR AUTOMATED AIRCRAFT TAXIING

(71) Applicant: THE BOEING COMPANY, Chicago, IL (US)

(72) Inventor: Yu Sang Chik, Richmond (CA)

(73) Assignee: THE BOEING COMPANY, Arlington, VA (US)

( * ) Notice: Subject to any disclaimer, the term of this patent is extended or adjusted under 35 U.S.C. 154(b) by 246 days.

(21) Appl. No.: 18/050,836

(22) Filed: Oct. 28, 2022

(65) Prior Publication Data

US 2024/0144836 A1 May 2, 2024

(51) Int. Cl.
*G08G 5/06* (2006.01)
*B64D 47/08* (2006.01)
*G06V 20/58* (2022.01)

(52) U.S. Cl.
CPC ............ *G08G 5/065* (2013.01); *B64D 47/08* (2013.01); *G06V 20/58* (2022.01); *G06V 2201/07* (2022.01)

(58) Field of Classification Search
CPC .... G08G 5/065; G06V 20/58; G06V 2201/07; B64D 47/08
See application file for complete search history.

(56) References Cited

U.S. PATENT DOCUMENTS

| | | | | |
|---|---|---|---|---|
| 2004/0059497 | A1* | 3/2004 | Sankrithi | G08G 5/0021 701/120 |
| 2013/0201037 | A1* | 8/2013 | Glover | G08G 5/065 340/945 |
| 2018/0336007 | A1* | 11/2018 | Li | G10L 15/22 |
| 2019/0146083 | A1* | 5/2019 | Pesik | G08G 5/0021 701/120 |
| 2019/0347943 | A1* | 11/2019 | Pesik | G06V 10/22 |
| 2019/0384303 | A1* | 12/2019 | Muller | G08G 1/166 |
| 2021/0012518 | A1* | 1/2021 | Harris | G06T 7/62 |
| 2021/0191419 | A1* | 6/2021 | Xu | G05D 1/0088 |
| 2021/0300342 | A1* | 9/2021 | Hara | B62D 15/0285 |

* cited by examiner

*Primary Examiner* — Navid Z. Mehdizadeh
*Assistant Examiner* — Oliver Tan
(74) *Attorney, Agent, or Firm* — Moore IP Law (57) ABSTRACT

An aircraft includes a plurality of stereo cameras. The aircraft further includes one or more processors and one or more memory devices. The one or more memory devices store instructions that are executable by the one or more processors to perform operations including generating a three-dimensional depth map based on a plurality of outputs of the plurality of stereo cameras. The instructions include detecting one or more objects represented in the plurality of outputs. The instructions further include transmitting one or more taxi control signals based on the three-dimensional depth map and the one or more objects.

20 Claims, 8 Drawing Sheets

SYSTEMS AND METHODS FOR AUTOMATED AIRCRAFT TAXIING

FIELD OF THE DISCLOSURE

The present disclosure is generally related to systems and methods for automated aircraft taxiing.

BACKGROUND

Aircrafts taxi when they move on the ground under their own power. This movement is part of the regular operation of aircraft as they move from where they are loaded (e.g., an airport terminal) to where they begin their takeoff or from where they land to where they unload. The process of taxiing can be both time consuming and resource intensive as multiple members of a ground crew are required at various points of the taxiing process to ensure that the aircraft does not collide with any objects.

SUMMARY

In a particular implementation, an aircraft includes a plurality of stereo cameras. The aircraft further includes one or more processors and one or more memory devices. The one or more memory devices store instructions that are executable by the one or more processors to perform operations including generating a three-dimensional depth map based on a plurality of outputs of the plurality of stereo cameras. The instructions include detecting one or more objects represented in the plurality of outputs. The instructions further include transmitting one or more taxi control signals based on the three-dimensional depth map and the one or more objects.

In another particular implementation, a method includes generating a three-dimensional depth map based on a plurality of outputs of a plurality of stereo cameras coupled to an aircraft. The method includes detecting one or more objects represented in the plurality of outputs. The method further includes transmitting one or more taxi control signals based on the three-dimensional depth map and the one or more objects.

In another particular implementation, a computer-readable storage device stores instructions that are executable by one or more processors to perform operations. The operations include generating a three-dimensional depth map based on a plurality of outputs of a plurality of stereo cameras coupled to an aircraft. The operations include detecting one or more objects represented in the plurality of outputs. The operations further include transmitting one or more taxi control signals based on the three-dimensional depth map and the one or more objects.

The features, functions, and advantages described herein can be achieved independently in various implementations or may be combined in yet other implementations, further details of which can be found with reference to the following description and drawings.

DETAILED DESCRIPTION

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Figure 1:
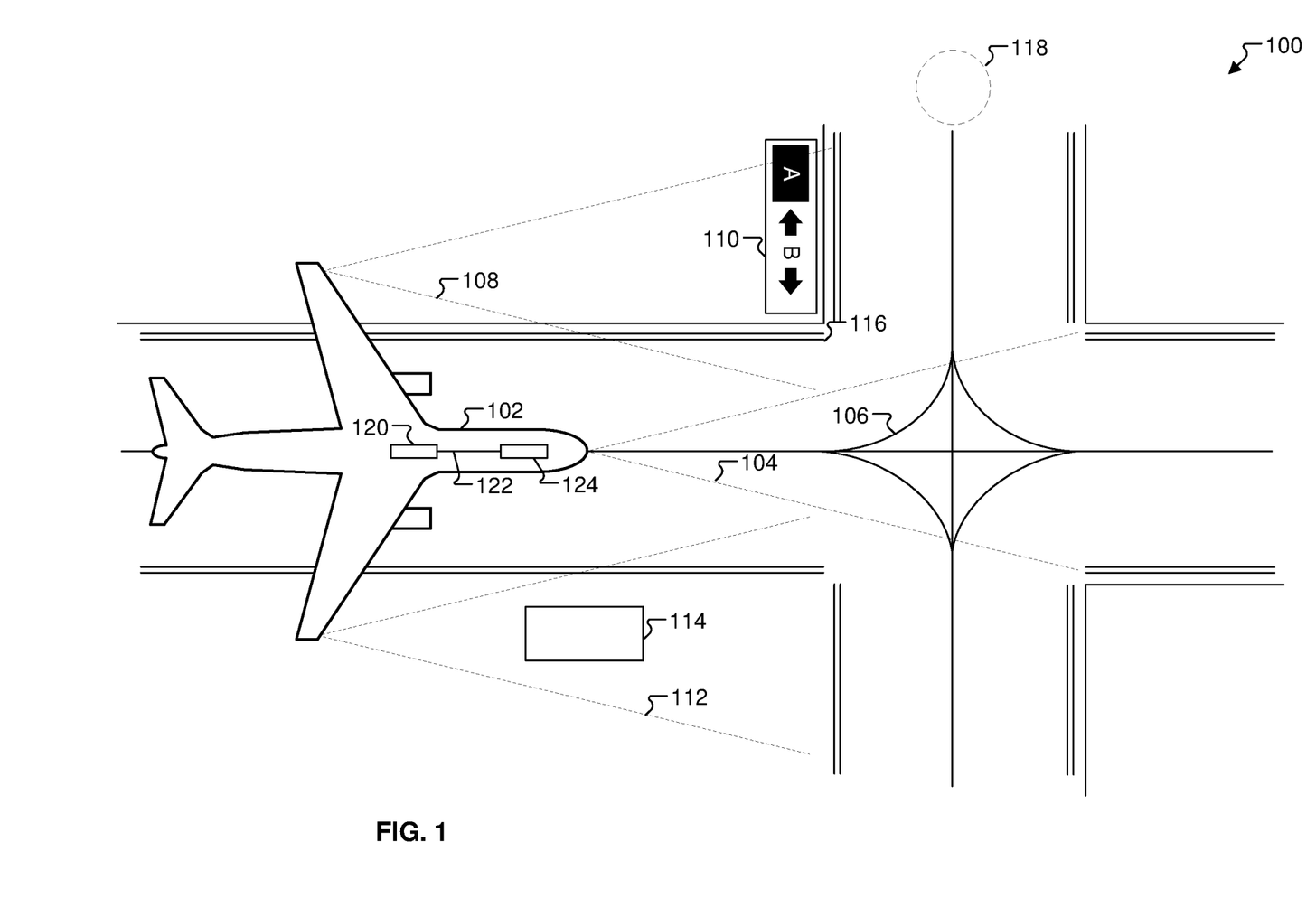
FIG. 1 is a diagram that illustrates an aircraft with an automated taxiing system.

Referring to FIG. 1, a diagram 100 of an aircraft 102 with an auto-taxi system 120 is shown. The aircraft 102 includes at least three stereo cameras. A first stereo camera of the aircraft 102 is located on an exterior of the aircraft 102 and has a first field of view 104. A second stereo camera of the aircraft 102 is located on a first wing of the aircraft 102 and has a second field of view 108. A third stereo camera of the aircraft 102 is located on the opposite wing of the aircraft 102 and has a third field of view 112. The aircraft 102 may include additional stereo cameras with fields of view that are not depicted in FIG. 1. In the example illustrated in FIG. 1, the first field of view 104, the second field of view 108, and the third field of view 112 are all depicted as oriented along a direction corresponding to forward translation of the aircraft 102.

The auto-taxi system 120 of aircraft 102 may be configured to control one or more aspects of operation of the aircraft 102 as the aircraft 102 taxis to a taxi waypoint 118. As used herein, a "taxi waypoint" refers to a location along a taxi route, such as a starting point of the taxi route, an ending point of the taxi route, or a point between the starting point and the ending point that the aircraft 102 is expected to traverse. Information specifying the taxi waypoint 118 may be input by a pilot of the aircraft 102 based on instructions received from an airport traffic control system. Alternatively, the information specifying the taxi waypoint 118 may be transmitted to the auto-taxi system 120 by the airport traffic control system with the pilot confirming activation of the auto-taxi system 120 before the auto-taxiing begins. In some implementations, the auto-taxi system 120 may also receive information identifying areas that are to be avoided. For example, an airport may have one taxiway (or a portion thereof) shut down for maintenance or safety reasons and may instruct the aircraft 102 to avoid that taxiway and use an alternative taxiway instead. The taxi waypoint 118 may be identified by a particular runway designation, a particular taxiway designation, global positioning system coordinates, another method of identifying a location on a runway or taxiway, or a combination thereof.

The auto-taxi system 120 may be operable to provide taxi control signals 122 to one or more systems of the aircraft 102. The taxi control signals 122 may include digital signals, analog signals, or other types of electromagnetic signals (such as pulse width modulated signals). The taxi control signals 122 may cause one or more systems of the aircraft 102 to be activated or deactivated, or may command the one or more systems to perform specific operations. As an example, the taxi control signals 122 may command actuation of brakes of the aircraft 102 to cause the aircraft 102 to stop. As another example, the taxi control signals 122 may command one or more engines of the aircraft 102 to reduce thrust.

The auto-taxi system 120 may be operable to provide the taxi control signals 122 to an auto-tiller system 124. The auto-tiller system 124 may be configured to automatically (e.g., without input from the pilot) steer the aircraft 102. The auto-tiller system 124 may be configured to turn a nose wheel of the aircraft 102 based on the taxi control signals 122. The auto-taxi system 120 may provide taxi control signals 122 to the auto-tiller system 124 indicating that the aircraft 102 should perform a particular turn. For example, the auto-taxi system 120 may indicate an angle of the turn (e.g., an angle relative to a longitudinal axis of the aircraft 102), a nose wheel angle during the turn, or another turn parameter. In this example, the auto-tiller system 124 controls one or more actuators coupled to the nose wheel of the aircraft 102 to cause the nose wheel to turn to the specified angle and uses a feedback control mechanism to maintain the specified angle until the auto-taxi system 120 commands a change.

The auto-taxi system 120 of the aircraft 102 may be operable to detect ground markings 106 that are located within one or more of the first field of view 104, the second field of view 108, or the third field of view 112. In a particular aspect, the auto-taxi system 120 uses a machine learning model to identify the ground markings 106. The ground markings 106 may include, for example, standardized symbols, signs, lights, and other visual identifiers that enable the machine-learning model to identify the markings regardless of a location (e.g., airport) of the ground markings 106 and the aircraft 102. At least some of the ground markings 106 designate specific portions of the airport, and the auto-taxi system 120 uses information obtained from such ground markings 106 to determine the location of the aircraft 102 in an airport taxiway system, a location of the aircraft 102 relative to a particular taxiway, a location of the aircraft 102 relative to the taxi waypoint 118, or a combination thereof.

The auto-taxi system 120 may use the ground markings 106 to determine taxi control signals 122 for the aircraft 102. For example, the auto-taxi system 120 may identify a centerline marking of the ground markings 106, where the centerline marking indicates a center of a taxiway lane. In response to identifying the centerline marking, the auto-taxi system 120 may send taxi control signals 122 to manipulate the auto-tiller system 124 of the aircraft 102 to align movement of the aircraft 102 with the centerline marking. In another example, the auto-taxi system 120 may identify that a different part of the ground markings 106 indicate that the aircraft 102 is approaching a turn. If the auto-taxi system 120 determines that the aircraft 102 needs to turn to reach the taxi waypoint 118, the auto-taxi system 120 may send taxi control signals 122 to the auto-tiller system 124 to turn the aircraft 102 along the second portion of the ground markings.

The auto-taxi system 120 may be configured to identify a taxiway sign 110 located in one or more of the first field of view 104, the second field of view 108, or the third field of view 112. The auto-taxi system 120 may use the machine learning model to identify the taxiway sign 110. The taxiway sign 110 may use standardized annotations that enable the machine-learning model to identify the taxiway sign 110 regardless of a location (e.g., airport) of the taxiway sign 110 and the aircraft 102.

The auto-taxi system 120 may use the taxiway sign 110 to identify a current location of the aircraft 102. For example, the auto-taxi system 120 may use the taxiway sign 110 to identify that the aircraft 102 is currently on taxiway A and is approaching an intersection with taxiway B. In the example illustrated in FIG. 1, the taxi waypoint 118 is located on taxiway B; accordingly, the auto-taxi system 120 may determine that the aircraft 102 needs to turn onto taxiway B to reach the taxi waypoint 118. In this example, the auto-taxi system 120 may cause the auto-tiller system 124 to control an orientation of the aircraft 102 as the aircraft 102 turns onto taxiway B. To illustrate, the auto-taxi system 120 and the auto-tiller system 124 may cooperate to cause the nose wheel of the aircraft 102 to follow a turn line of the ground markings 106.

In some implementations, the auto-taxi system 120 and the auto-tiller system 124 may cooperate to cause the nose wheel of the aircraft 102 to steer the aircraft 102 based on the turn line but without precisely following the turn line. For example, since main gear of the aircraft 102 follow inside a track of the nose gear, the nose gear may be steered wide of the turn marking to reduce a risk of the main gear of the aircraft 102 running off a side of the taxiway. In some implementations, the auto-taxi system 120 and the auto-tiller system 124 may cooperate to cause the nose wheel of the aircraft 102 to turn based on a turn marking of the ground markings 106 and based on a side marking 116 of the ground markings 106. The side marking 116 indicates an edge of the taxiway. In such implementations, the auto-taxi system 120 and the auto-tiller system 124 may cooperate to cause the nose wheel of the aircraft 102 to steer the aircraft 102 to substantially follow the turn marking without allowing the main gear to pass the side marking 116.

The auto-taxi system 120 may determine a distance between the aircraft 102 and a detected sign or ground marking. For example, while the aircraft 102 is taxiing on the taxiway, the auto-taxi system 120 may detect the taxiway sign 110. When the taxiway sign 110 is initially detected, the distance between the aircraft 102 and the taxiway sign 110 may be sufficient to indicate that a turn would be premature. Accordingly, the auto-taxi system 120 may not transmit the taxi control signals 122 that cause the auto-tiller system 124 to initiate a turn when the taxiway sign 110 is initially detected. After the aircraft 102 has taxied further down the taxiway, the auto-taxi system 120 may determine that the distance between the aircraft 102, and the taxiway sign 110 is small enough that a turn is viable. The auto-taxi system 120 may cause the auto-tiller system 124 to control an orientation of the aircraft 102 as the aircraft 102 turns onto taxiway B responsive to the distance being reduced. Similarly, the auto-taxi system 120 may determine the taxi control signals 122 to transmit based on a distance between the aircraft 102 and the ground markings 106.

The auto-taxi system 120 may further be configured to detect objects (e.g., an object 114) in one or more of the first field of view 104, the second field of view 108, or the third field of view 112. In a particular implementation, the auto-taxi system 120 uses a machine-learning model to perform object detection based on images captured by the stereo cameras. In some implementations, the auto-taxi system 120 is configured to generate a three-dimensional depth map based on the images captured by the stereo cameras, and to detect one or more objects (e.g., the object 114) based on the three-dimensional depth map. In other implementations, the auto-taxi system 120 is configured to detect objects in two-dimensional images. In such implementations, the auto-taxi system 120 may be configured to generate the three-dimensional depth map to identify detected objects or to determine how to respond to a detected object.

In a particular aspect, the auto-taxi system 120 is configured to use the three-dimensional depth map to determine whether an object (e.g., the object 114) is a collision hazard. For example, the auto-taxi system 120 may determine (or estimate) dimensions of the object 114 based on the three-dimensional depth map, may determine a position of the object 114 relative to a portion of the aircraft 102 based on the three-dimensional depth map, etc. In this example, the auto-taxi system 120 may compare the dimensions of the object 114 to known or measured dimensions of the aircraft 102 to determine whether the object 114 is a collision hazard. If the auto-taxi system 120 determines that the object 114 is a collision hazard, the auto-taxi system 120 may generate an alert to notify the pilot of the collision hazard, may perform one or more collision avoidance operations, or both. In a particular aspect, the auto-taxi system 120 may determine whether the object 114 is a collision hazard independently of identifying what the object 114 is. For example, the auto-taxi system 120 may perform collision avoidance operations based on the three-dimensional depth map independently of (e.g., before, after, or in parallel with) performing operations to identify the object 114, or even if the auto-taxi system 120 is unable to identify the object 114.

In a particular implementation, the auto-taxi system 120 may also, or alternatively, compare dimensions of the object 114 to safety boundaries associated with the aircraft 102. The safety boundaries describe safe distances from particular portions of the aircraft 102, and safety boundaries may be different for different areas of the aircraft 102, for different types of objects, or both. For example, an area near an intake of an engine of the aircraft 102 may be associated with a large safety boundary. To illustrate, an engine safety boundary may indicate that, during operation of the engine, no object may pass below the engine. In this illustrative example, the engine safety boundary extends from the engine to the ground; thus, any object that would pass under the engine as the aircraft 102 taxis is considered a collision hazard. In a contrasting example, a wingtip safety boundary may extend several feet below and/or several feet beyond a tip of each wing. In this example, the object 114 may not be considered a collision hazard if the object 114 will pass below the wingtip and has a height that is less than a lower edge of the wingtip safety boundary.

While object detection in FIG. 1 is described in relation to particular fields of view, every stereo camera of the aircraft 102 may be configured to identify each of the various types of objects described above (as well as others). For example, the auto-taxi system 120 may be configured to identify the ground markings 106, taxiway sign 110, object 114, and side marking 116 in the first field of view 104, second field of view 108, and third field of view 112. Due to different positionings of the stereo cameras, the auto-taxi system 120 may react differently depending on which camera detected an object. For example, if the centerline marking of the ground markings 106 is detected in the second field of view 108, the auto-taxi system 120 may determine that a major steering correction is needed, whereas, if the centerline marking of the ground markings 106 is detected in the first field of view 104, little or no steering correction may be needed.

Figure 2:
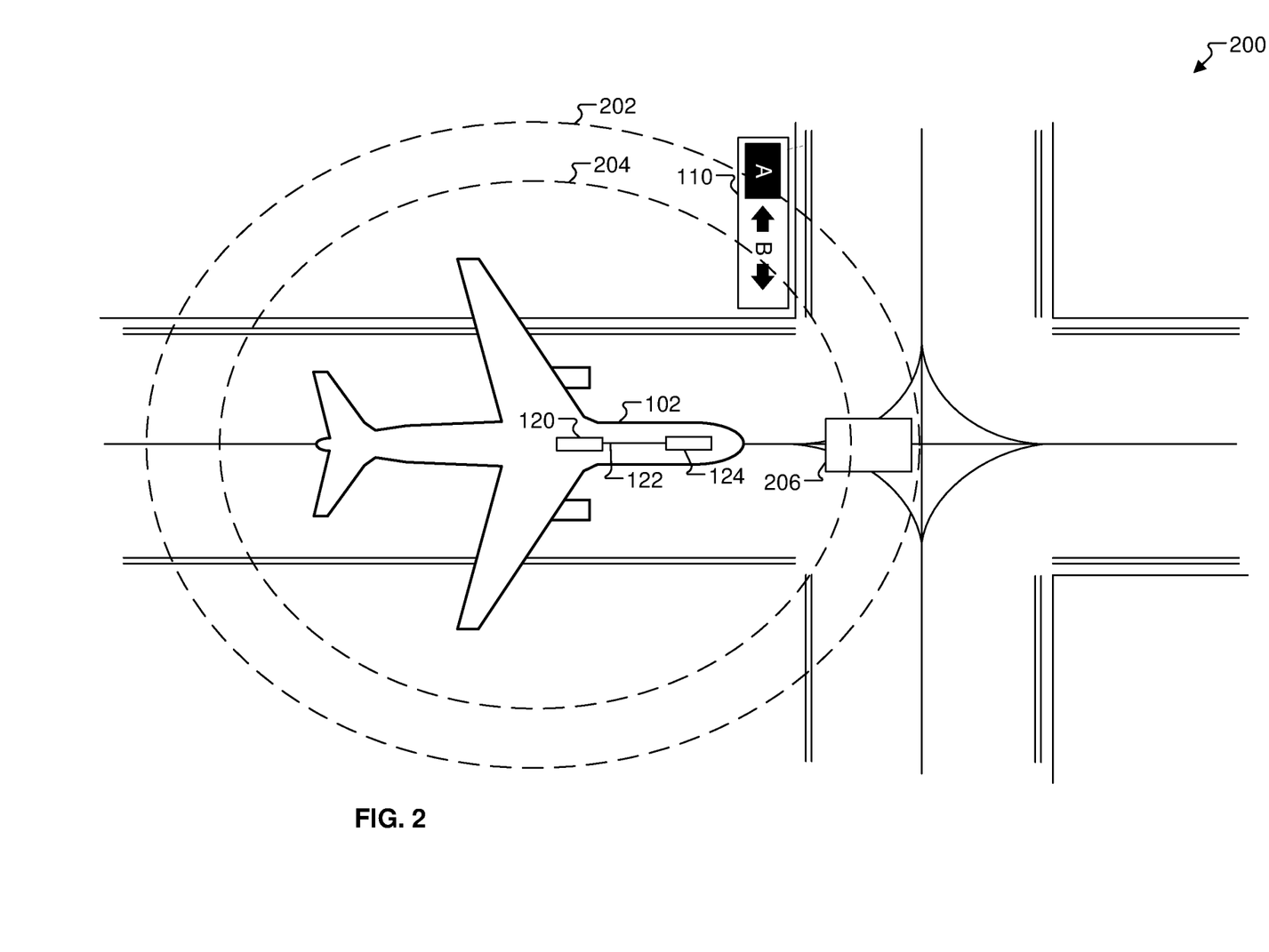
FIG. 2 is a diagram that illustrates an aircraft with an automated taxiing system.

Referring to FIG. 2, a diagram 200 of the aircraft 102 with the auto-taxi system 120 is shown. FIG. 2 also illustrates one example of safety boundaries associated with the aircraft 102.

In FIG. 2, the safety boundaries are represented as including a first threshold distance 202 and a second threshold distance 204. The first threshold distance 202 may correspond to a notification distance that triggers a notification signal to a pilot. The second threshold distance 204 may correspond to a response distance that causes the auto-taxi system 120 to deactivate, to stop movement of the aircraft 102, to cause the aircraft 102 to perform one or more collision avoidance maneuvers, or a combination thereof. Although FIG. 2 illustrates the safety boundaries as including two threshold distances, in other examples, the aircraft 102 may be associated with more or fewer safety boundaries. Additionally, in the top view illustrated in FIG. 2, the safety boundaries are illustrated in only one plane; however, the safety boundaries may extend in more than one plane, and in some implementations, may have different threshold distances in different planes. To illustrate, the first threshold distance 202 may be different at ground level than at a height of the wings of the aircraft 102. Further, in FIG. 2, the threshold distances 202, 204 are illustrated as defining a roughly oval shaped boundary with a major axis aligned with a longitudinal axis of the aircraft 102; however, in other implementations, the safety boundaries have different shapes. To illustrate, the safety boundaries may correspond to closest approach distances to any point on the aircraft 102, in which case the shape of the safety boundaries correspond roughly to the outline of the aircraft 102 offset by a threshold distance.

The auto-taxi system 120 may be configured to dynamically determine one or more of the safety boundaries (e.g., the first threshold distance 202, the second threshold distance 204, or both). For example, the auto-taxi system 120 may determine one or more distance thresholds of the safety boundaries based on current weather conditions. To illustrate, the auto-taxi system 120 may determine the first threshold distance 202 to be a first distance when the weather is fair and sunny and may determine the first threshold distance 202 to be a second distance when the weather is rainy or icy. In this illustrative example, the second distance may be longer than the first distance to provide the auto-taxi system 120 and the pilot additional time to react to account for extended stopping distances or poor visibility.

As another example, the auto-taxi system 120 may determine one or more distance thresholds of the safety boundaries based on a speed of the aircraft 102. For example, the first threshold distance 202, the second threshold distance 204, or both, may increase as the speed of the aircraft 102 increases.

In some implementations, the auto-taxi system 120 performs response actions when an object that is a potential collision hazard breaches a safety boundary. In such implementations, the auto-taxi system 120 does not perform the response actions when an object that is not a potential collision hazard breaches the safety boundary. For example, the auto-taxi system 120 may detect the taxiway sign 110 as being within the first threshold distance 202 or the second threshold distance 204. The auto-taxi system 120 may determine, based on the three-dimensional depth map, that the taxiway sign 110 has a first height. The auto-taxi system 120 may also determine that the wing of the aircraft 102 is the part that is moving towards the taxiway sign 110. For example, this may be determined based on the taxiway sign 110 being identified within the second field of view 108. The wing of the aircraft 102 may be determined to have a first clearance. Accordingly, the auto-taxi system 120 may determine that the taxiway sign 110 is not a potential collision hazard responsive to the first height being less than the first clearance.

As another example, the auto-taxi system 120 may detect the object 206 as being within the first threshold distance 202 or the second threshold distance 204. The auto-taxi system 120 may determine, based on the three-dimensional depth map, that the object 206 has a particular height. The auto-taxi system 120 may also determine that the nose of the aircraft 102 is the part of the aircraft 102 that is moving towards the object 206. For example, the auto-taxi system 120 may determine that the nose of the aircraft 102 is moving towards the object 206 based on the object 206 being identified within the first field of view 104. In this example, the auto-taxi system 120 may compare a height of the object 206 to a clearance height associated with the nose of the aircraft 102 to determine whether the object 206 is a potential collision hazard.

The clearance height of the aircraft 102 may be different for different portions of the aircraft 102. For example, the lowest part of the wing (e.g., an engine cowling) may be higher than a lowest part of the nose (e.g., the nose landing gear) so even if two objects have the same height, the auto-taxi system 120 may respond differently based on which part of the aircraft 102 each object is approaching. The nose of the aircraft 102 may be determined to have no clearance due to landing gear being located proximate to the nose. Accordingly, the auto-taxi system 120 may determine that the object 206 is a potential collision hazard even if the object 206 has the same height as the taxiway sign 110 (which is not considered to be a potential collision hazard).

The auto-taxi system 120 may perform a variety of response actions in response to detecting a potential collision hazard within the safety boundaries. For example, the auto-taxi system 120 may generate a notification signal to the pilot responsive to detecting a potential collision hazard within the first threshold distance 202. As another example, the auto-taxi system 120 may perform one or more collision avoidance operations responsive to detecting a potential collision hazard within the second threshold distance 204.

In a particular implementation, the auto-taxi system 120 uses a machine-learning model to perform object detection and/or object recognition. In some implementations, the auto-taxi system 120 may be configured to give certain identified objects special treatment. For example, if the machine-learning model determines that an object approaching a wing of the aircraft 102 is a person, the machine-learning model may flag the person as a potential collision hazard, due to safety regulations, even if the wing of the aircraft 102 has sufficient clearance to not collide with the person.

While FIG. 2 shows the first threshold distance 202 and second threshold distance 204 as regular shapes, the shape may instead be irregular and based on the positioning of the various stereo cameras on the aircraft 102. Additionally, two or more stereo cameras of the aircraft 102 may have different threshold distances rather than a shared threshold distance. For example, a stereo camera located on the horizontal stabilizer of the aircraft 102 may be configured to detect potential collision hazards at the height of the horizontal stabilizer for the entire length of the aircraft 102. A stereo camera located proximate to the nose of the aircraft 102 may be configured to detect potential collision hazards for a distance shorter than a length of the aircraft 102.

Figure 3:
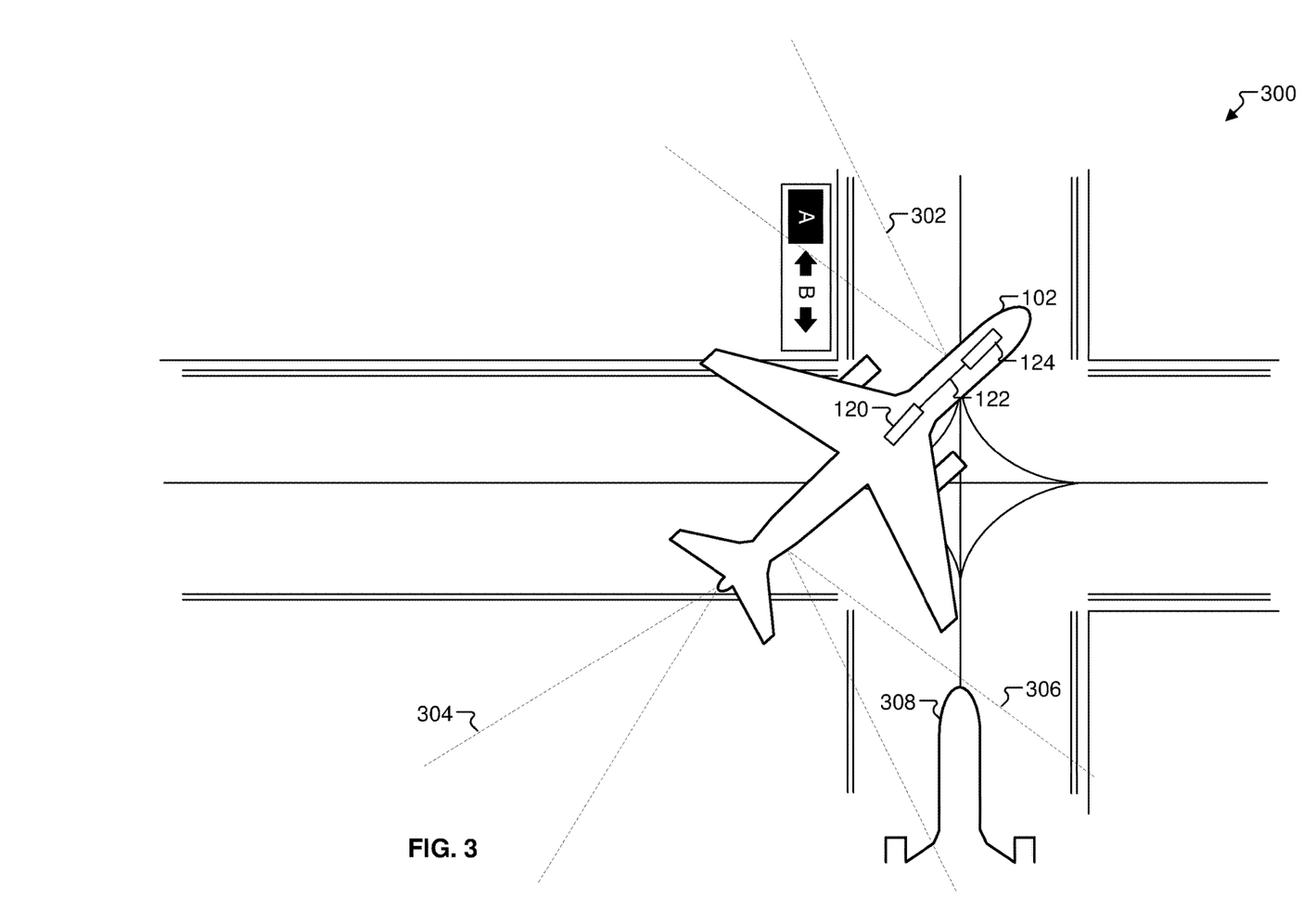
FIG. 3 is a diagram that illustrates an aircraft with an automated taxiing system.

Referring to FIG. 3, a diagram 300 of the aircraft 102 with the auto-taxi system 120 is shown. Diagram 300 shows additional fields of view that may be captured by stereo cameras of the aircraft 102. These additional fields of view may be combined with the fields of view depicted in FIG. 1 to provide additional situational awareness to the auto-taxi system 120.

A first additional field of view 302 corresponds to a stereo camera located on a side of the aircraft 102 proximate to the nose of the aircraft 102. The first additional field of view 302 includes a field of view from the nose of the aircraft 102 and along a direction corresponding to rotation of the aircraft 102 about a yaw axis. A second additional field of view 304 corresponds to a stereo camera located on a tail of the aircraft 102. The second additional field of view 304 includes a field of view aft of the tail of the aircraft 102. A third additional field of view 306 corresponds to a stereo camera located on a side of the aircraft 102 between the nose and the tail of the aircraft 102. The third additional field of view 306 includes a field of view from the side of the aircraft 102 and along a direction corresponding to rotation of the aircraft 102 about the yaw axis.

In the example illustrated in FIG. 3, as the aircraft 102 is turning to port (e.g., onto taxiway B), the auto-taxi system 120 may detect an object in one of the additional fields of view. For example, the auto-taxi system 120 may detect a second aircraft 308 in the third additional field of view 306. The auto-taxi system 120 may perform one or more response actions, as described above, based on a determination that a detected object is a potential collision hazard and that the detected object is within a safety boundary associated with the aircraft 102.

In the example illustrated in FIG. 3, the auto-taxi system 120 is steering the aircraft 102 through the turn onto taxiway B. The auto-taxi system 120 may determine the taxi control signals 122 necessary for making a turn onto the taxiway B and transmit the taxi control signals 122 to the auto-tiller system 124. The taxi control signals 122 may be configured to account for the movement characteristics of the aircraft 102. For example, the auto-taxi system 120 may refrain from following a center line throughout the entire turn to prevent a main gear of the aircraft 102 from going over an edge of the taxiway.

Figure 4:
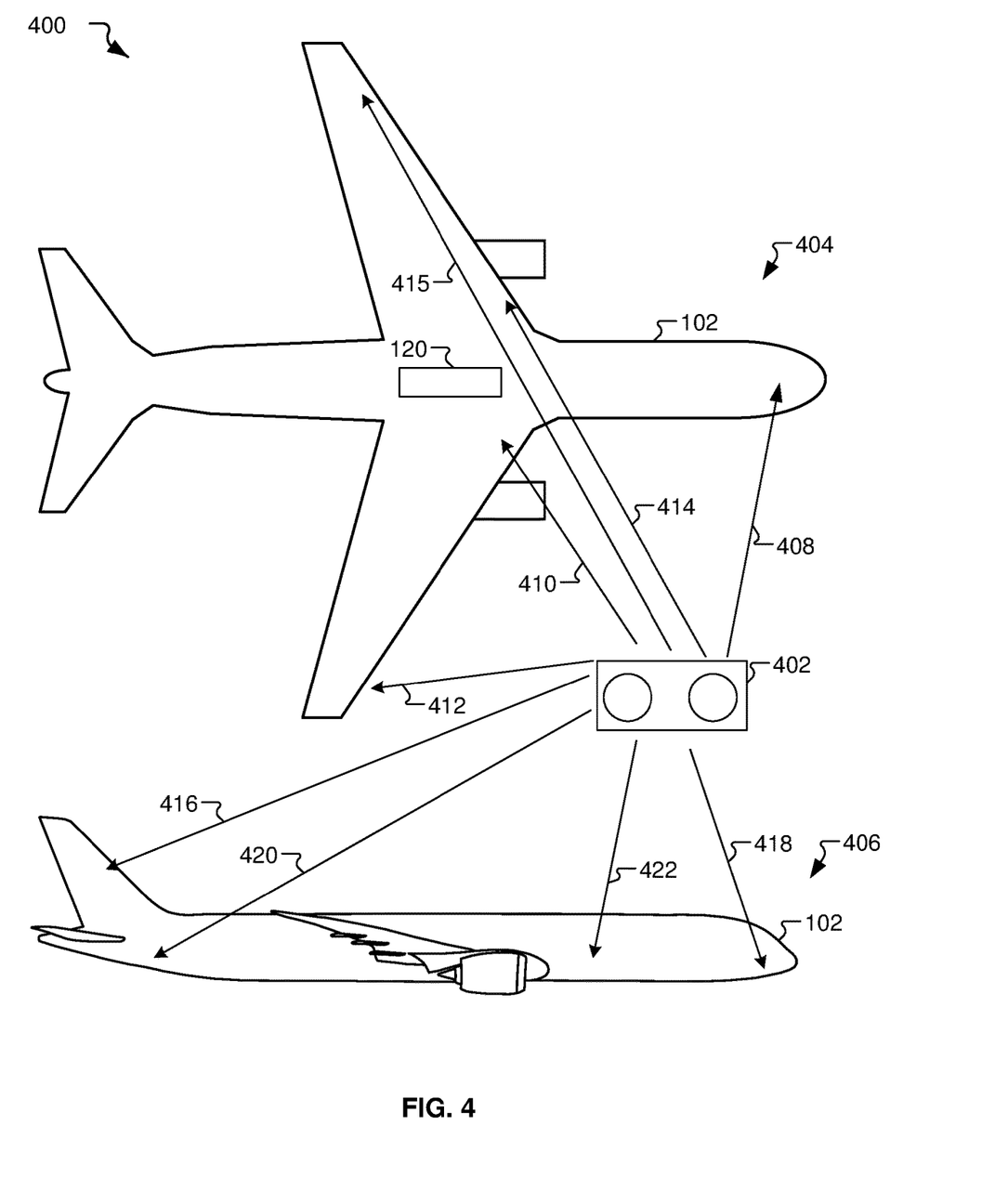
FIG. 4 is a diagram that illustrates an aircraft with a plurality of stereo cameras.

Referring to FIG. 4, a diagram 400 of the aircraft 102 with the auto-taxi system 120 is shown. The diagram 400 includes an overhead view 404 and a side view 406 of the aircraft 102. The diagram 400 shows a particular, non-limiting example, of several placements for stereo cameras 402 about the aircraft 102.

In a particular example, as illustrated in the overhead view 404 of FIG. 4, the aircraft 102 includes a first stereo camera 408 located on an exterior of a flightdeck of the aircraft 102, a second stereo camera 410 located on an inboard portion (e.g., inboard leading edge) of a first wing, a third stereo camera 412 on an outboard portion (e.g., outboard edge) of the first wing, a fourth stereo camera 414 on an inboard portion of a second wing of the aircraft 102, and a fifth stereo camera 415 on an outboard portion of the second wing.

In this example, as illustrated in the side view 406 of the aircraft 102, the aircraft 102 further includes a sixth stereo camera 416 on a vertical stabilizer of the aircraft 102, a seventh stereo camera 418 proximate to the nose of the aircraft 102, an eighth stereo camera 420 proximate to a horizontal stabilizer of the aircraft 102, and a ninth stereo camera 422 positioned between the seventh stereo camera 418 and the eighth stereo camera 420. Cameras with placements similar to placements illustrated in the side view 406 may be located on an opposite side of the fuselage of the aircraft 102.

Each camera of the stereo cameras 402 may be configured to have a different field of view to give additional information to the auto-taxi system 120. For example, the first stereo camera 408 may be positioned to collect information about potential clearance hazards for the top of the aircraft 102, ground signs, potential collision hazards for the cabin, potential collision hazards for the landing gear, or a combination thereof. Additional cameras may be located near the nose of the aircraft 102 to focus on collecting fields of view emphasizing one or more of these aspects.

The stereo cameras 402 may be located at different heights and/or oriented at different angles to identify potential collision hazards for parts of the aircraft 102 that have different clearances. The stereo cameras 402 may further be positioned in additional locations beyond the exemplary positions shown in FIG. 4. For example, the stereo cameras 402 may also include a stereo camera placed near an engine, a wheel well, a winglet, or another component of the aircraft 102.

The stereo cameras 402 may further be angled to capture fields of view along different axes relative to the aircraft 102. For example, the stereo cameras 402 may include one or more stereo cameras positioned to capture a field of view along a direction corresponding to forward translation of the aircraft 102, one or more stereo cameras positioned to capture a field of view along a direction corresponding to reverse translation of the aircraft 102, one or more stereo cameras positioned to capture a field of view along a direction corresponding to a component of the aircraft 102 rotating about a yaw axis of the aircraft 102, or a combination thereof. The stereo cameras 402 may include cameras at non-right angles relative to the axes of the aircraft 102. For example, the stereo cameras 402 may include a camera at an angle that is 45° offset from a longitudinal axis of the aircraft 102 to capture images of ground signs and potential collision hazards.

Figure 5:
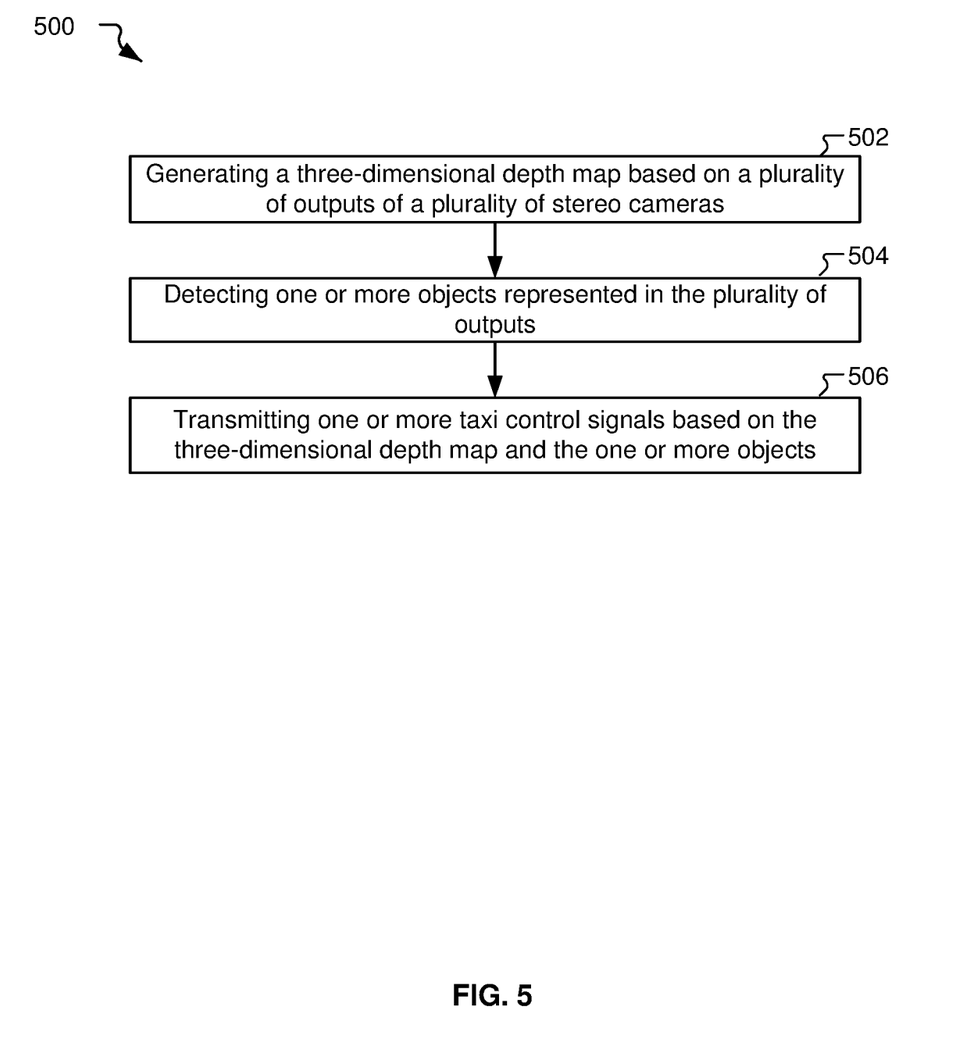
FIG. 5 is a flow chart of an example of a method of automated taxiing.

Referring to FIG. 5, a particular illustrative example of a method is depicted and generally designated 500. In a particular implementation, operations of the method 500 are initiated, performed, or controlled by a processor, such as by one or more processors of the auto-taxi system 120 of FIGS. 1-4 executing instructions.

The method 500 includes generating, at block 502, a three-dimensional depth map based on a plurality of outputs of a plurality of stereo cameras coupled to an aircraft 102. For example, the auto-taxi system 120 of FIG. 1-4 may receive a plurality of outputs of the stereo cameras 402. The outputs may include a pair of images for each of the stereo cameras. The pair of images may allow the system to simulate binocular vision to estimate depths of objects in the images. The auto-taxi system 120 may be configured to combine the information in the outputs of the stereo cameras 402 to generate a three-dimensional depth map. The three-dimensional depth map may identify distances between the aircraft 102 and any objects detected in the three-dimensional depth map. The three-dimensional depth map may further identify heights of objects and positions of the objects relative to the aircraft 102 (e.g., the depth map may identify that a particular object is in front of a nose of the aircraft 102 as opposed to in front of a wing). The three-dimensional depth map may be updated at a regular interval as new images are captured by the stereo cameras 402.

The method 500 includes detecting, at block 504, one or more objects represented in the plurality of outputs. For example, the auto-taxi system 120 may perform object detection, object recognition, or both, on the plurality of outputs of the stereo cameras. The auto-taxi system 120 may use a machine-learning model to identify various objects in images captured by the stereo cameras 402. The machine-learning model may be trained on images from airports in various locations to identify standardized airport signage and markings. The machine-learning model may be further configured to identify additional objects that may be found in airports such as vehicles, people, or animals. Object detection and/or object recognition may be performed at a regular interval as new images are captured by the stereo cameras 402. The interval for performing object detection and/or object recognition may be the same or different from the interval for updating the three-dimensional depth map.

Generating the three-dimensional depth map, at block 502, and detecting objects, at block 506, may be performed agnostically to each other. For example, the three-dimensional depth map may be generated simultaneously (e.g., on different processors or different processor threads) with the machine-learning model performing object detection. Alternatively, the three-dimensional depth map may be used as an input in the object detection and/or object recognition or may be used to initiate object detection and/or recognition. For example, object recognition may be performed for objects that are within a certain distance based on the three-dimensional depth map.

The method 500 further includes transmitting, at block 506, one or more taxi control signals based on the three-dimensional depth map and the one or more objects. For example, the auto-taxi system 120 may transmit the taxi control signals 122 to the auto-tiller system 124.

The auto-taxi system 120 may determine the taxi control signals 122 based on the three-dimensional depth map. For example, if the three-dimensional depth map indicates that the object 206 is within the first threshold distance 202, the taxi control signals 122 may include a signal activating a warning to the pilot of the aircraft 102. If the three-dimensional depth map indicates that the object 206 is within the second threshold distance 204, the taxi control signals 122 may include a signal activating the brakes and stopping forward thrust of the engines. The auto-taxi system 120 may take height and position of the object into consideration when determining the taxi control signals 122. For example, the auto-taxi system 120 may not make any changes to the taxi control signals 122 responsive to detecting that a wing of the aircraft 102 is approaching the taxiway sign 110 and that, based on the three-dimensional depth map, the wing will clear the taxiway sign 110.

The auto-taxi system 120 may determine the taxi control signals 122 based on the one or more objects detected by the machine learning model. For example, the auto-taxi system 120 may determine a route through the taxiways based on detecting the taxiway sign 110 and the ground markings 106. The auto-taxi system 120 may use the identified objects to determine a taxiway to turn onto, a taxiway to go straight on, and a route to follow along a desired taxiway. The auto-taxi system 120 may send signals to the auto-tiller system 124 to instruct the auto-tiller system 124 to steer the aircraft 102 to follow a desired course.

The auto-taxi system 120 may use additional information to determine the taxi control signals 122. For example, the auto-taxi system 120 may determine a route additionally based on a taxi waypoint 118, global positioning signals, or any other data from the aircraft 102 that the auto-taxi system 120 has access to. The taxi control signals 122 may be based on multiple pieces of data (e.g., determining to make a turn based on detected objects and a taxi waypoint 118) or just a single piece of data (e.g., stopping the aircraft 102 responsive to detecting a potential collision hazard).

Figure 6:
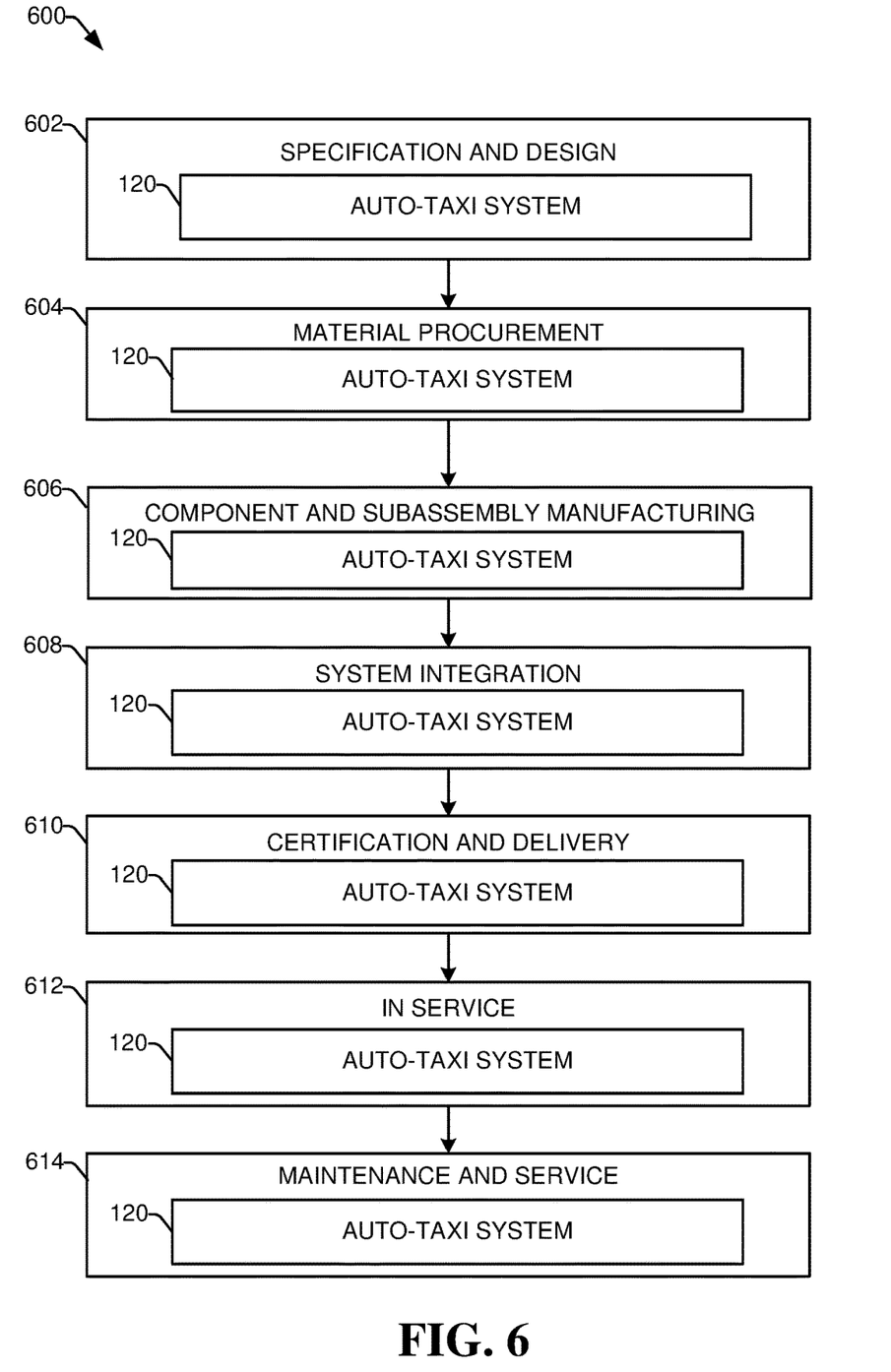
FIG. 6 is a flowchart illustrating a life cycle of an aircraft that includes an automated taxiing system.

Referring to FIG. 6, a flowchart illustrative of a life cycle of an aircraft that includes the auto-taxi system 120 is shown and designated 600. During pre-production, the exemplary life cycle 600 includes, at 602, specification and design of an aircraft, such as the aircraft 102 of FIGS. 1-4 or the aircraft 700 described with reference to FIG. 7. During specification and design of the aircraft, the life cycle 600 may include specification and design of the auto-taxi system 120. At 604, the life cycle 600 includes material procurement, which may include procuring materials for the auto-taxi system 120.

During production, the life cycle 600 includes, at 606, component and subassembly manufacturing and, at 608, system integration of the aircraft. For example, the life cycle 600 may include component and subassembly manufacturing of the auto-taxi system 120 and system integration of the auto-taxi system 120. At 610, the life cycle 600 includes certification and delivery of the aircraft and, at 612, placing the aircraft in service. Certification and delivery may include certification of the auto-taxi system 120 to place the auto-taxi system 120 in service. While in service by a customer, the aircraft may be scheduled for routine maintenance and service (which may also include modification, reconfiguration, refurbishment, and so on). At 614, the life cycle 600 includes performing maintenance and service on the aircraft, which may include performing maintenance and service on the auto-taxi system 120.

Each of the processes of the life cycle 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 7:
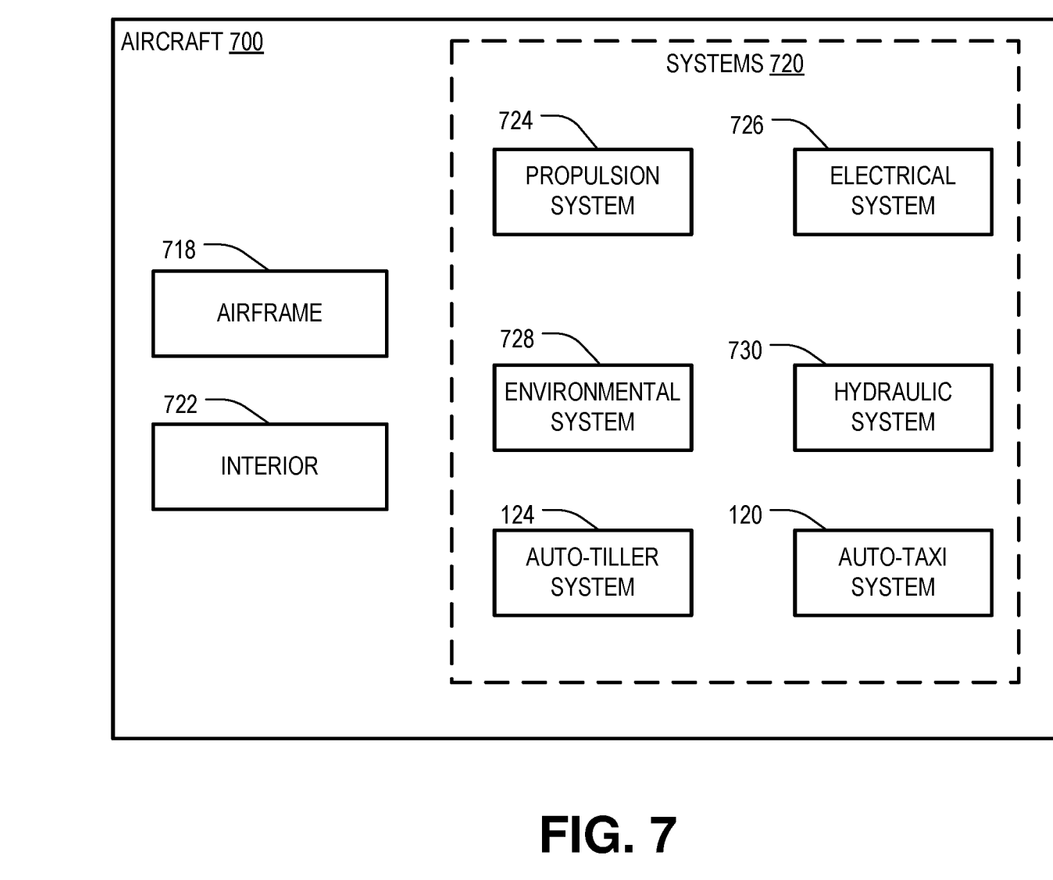
FIG. 7 is a block diagram of an aircraft that includes an automated taxiing system.

Aspects of the disclosure may be described in the context of an aircraft 700 as shown in FIG. 7. The aircraft 700 includes an airframe 718 with a plurality of systems 720 (e.g., high-level systems) and an interior 722. Examples of the systems 720 include one or more of a propulsion system 724, an electrical system 726, an environmental system 728, a hydraulic system 730, the auto-taxi system 120, and the auto-tiller system 124. Other systems can also be included.

The auto-taxi system 120, the auto-tiller system 124, or both, are configured to support aspects of computer-implemented methods and computer-executable program instructions (or code) according to the present disclosure. For example, the auto-taxi system 120, the auto-tiller system 124, or portions thereof, are configured to execute instructions to initiate, perform, or control one or more operations described with reference to FIGS. 1-5.

Figure 8:
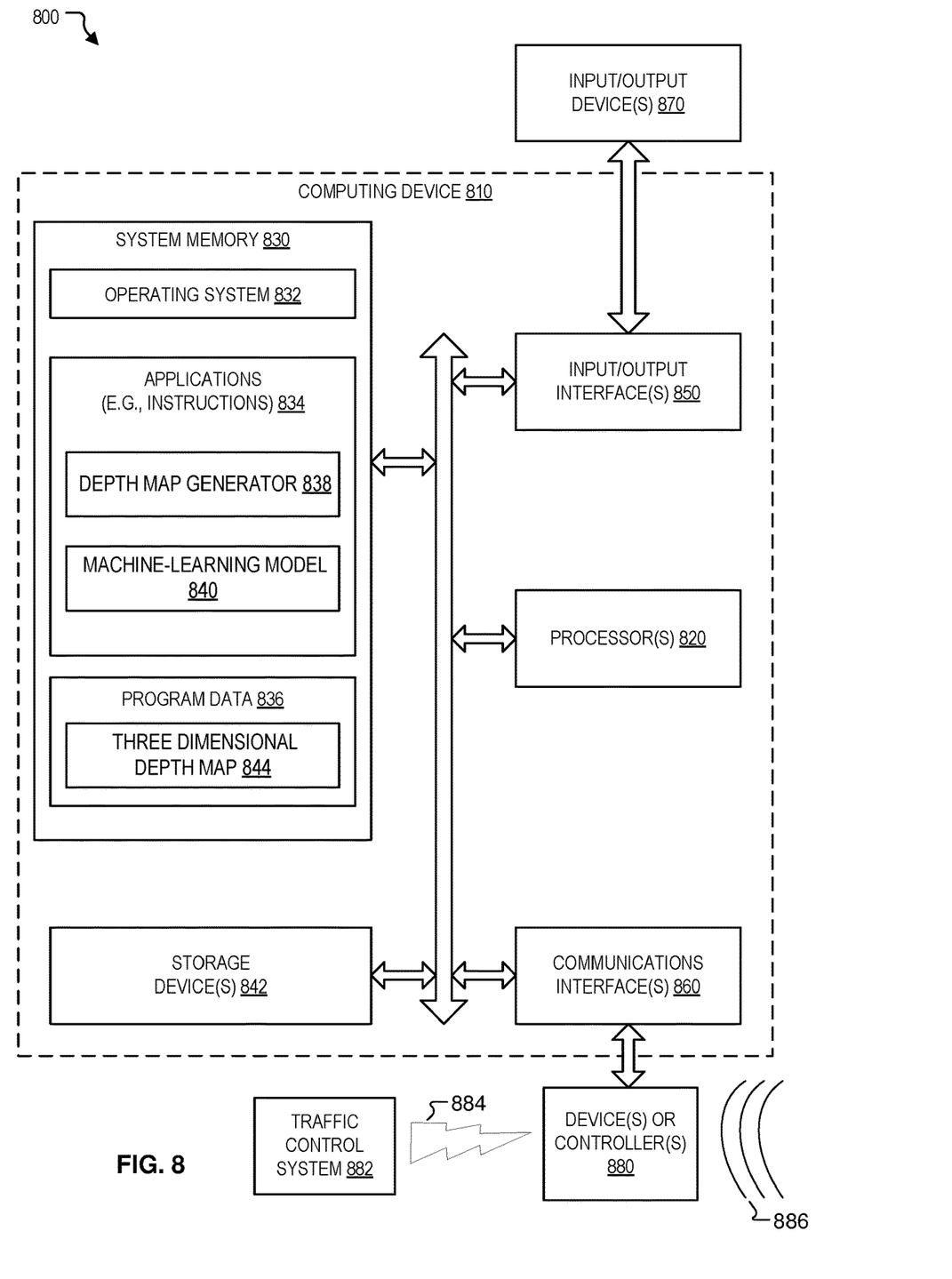
FIG. 8 is a block diagram of a computing environment configured to support aspects of automated taxiing methods and computer-executable program instructions (or code) according to the present disclosure.

FIG. 8 is an illustration of a block diagram of a computing environment 800 including a computing device 810. The computing device 810 is configured to support embodiments of computer-implemented methods and computer-executable program instructions (or code) according to the present disclosure. In some examples, the computing device 810, or portions thereof, executes instructions to initiate, perform, or control operations described herein. To illustrate, the computing device 810 may include, correspond to, or be included within the auto-taxi system 120 of any of FIGS. 1-7.

The computing device 810 includes one or more processors 820. The one or more processors 820 are configured to communicate with a system memory 830, one or more storage devices 842, one or more input/output interfaces 850, one or more communications interface(s) 860, or a combination thereof.

Depending on the particular implementation, the system memory 830 includes volatile memory devices (e.g., random access memory (RAM) devices), nonvolatile memory devices (e.g., read-only memory (ROM) devices, programmable read-only memory, or flash memory), one or more other memory devices, or a combination thereof. In FIG. 8, the system memory 830 stores an operating system 832, which can include a basic input/output system for booting the computing device 810 as well as a full operating system to enable the computing device 810 to interact with users, other programs, and other devices. The particular example of FIG. 8 also depicts that the system memory 830 stores one or more applications 834 executable by the one or more processors 820. The applications 834 are depicted as including a depth map generator 838 and a machine-learning model 840. In some examples, the one or more applications 834 include instructions executable by the one or more processors 820 to transmit signals between components of the computing device 810, such as the system memory 830, the one or more storage devices 842, the one or more input/output interfaces 850, the one or more communications interface(s) 860, or a combination thereof. The particular example of FIG. 8 also depicts that the system memory 830 (e.g., one or more memory devices) stores program data 836. Program data 836 may include any data necessary for operation of the one or more application 834 including the depth map generator 838 and the machine-learning model 840. The program data 836 may further include three-dimensional depth maps 844 generated by executing depth map generator 838.

In some implementations, the one or more storage devices 842 include nonvolatile storage devices, such as magnetic disks, optical disks, or flash memory devices. In some examples, the one or more storage devices 842 include removable memory devices, non-removable memory devices or both. In some cases, the one or more storage devices 842 are configured to store an operating system, images of operating systems, applications, and program data. In a particular example, the system memory 830, the one or more storage devices 842, or both, include tangible computer-readable media. As use herein, a storage device (e.g., the storage device 842) is a hardware device, and is not merely a signal.

In the example of FIG. 8, the one or more processors 820 are configured to communicate with the one or more input/output interfaces 850 to enable the computing device 810 to communicate with one or more input/output devices 870 to facilitate user interaction. In some implementations, the one or more input/output interfaces 850 include serial interfaces (e.g., universal serial bus (USB) interfaces or Institute of Electrical and Electronics Engineers (IEEE) 1394 interfaces), parallel interfaces, display adapters, audio adapters, one or more other interfaces, or a combination thereof. In some examples, the one or more input/output devices 870 include keyboards, pointing devices, displays, speakers, microphones, touch screens, one or more other devices, or a combination thereof. In some examples, the one or more processors 820 are configured to detect interaction events based on user input received via the one or more input/output interfaces 850.

In a particular example, the one or more processors 820 are configured to communicate with (or send signals to) one or more devices 880 using the one or more communications interface(s) 860. In some implementations, the communications interface(s) 860 include one or more wired interfaces (e.g., Ethernet interfaces), one or more wireless interfaces that comply with an IEEE 802.11 communication protocol, one or more other wireless interfaces, one or more optical interfaces, one or more other network interfaces, or a combination thereof. In some examples, the one or more devices 880 include host computers, servers, workstations, line replaceable units of an aircraft, one or more other computing devices, or a combination thereof. In some examples, the one or more processors 820 are configured to send one or more taxi control signals 122 to the auto-tiller system 124 via the communications interface(s) 860. In another example, the one or more processors 820 are configured to receive traffic management signals 884 from an airport traffic control system 882 via the communications interface(s) 860. The traffic management signals 884 may indicate, for example, a particular taxi waypoint. The particular taxi waypoint may include a final destination for taxiing, a waypoint that the aircraft is required to travel through, or a waypoint that the aircraft is forbidden from going through. The communications interface(s) 860 may also be configured to receive positioning signals 886, such as positioning signals indicating a global positioning location of the aircraft.

Although one or more of FIGS. 1-8 illustrate systems, apparatuses, and/or methods according to the teachings of the disclosure, the disclosure is not limited to these illustrated systems, apparatuses, and/or methods. One or more functions or components of any of FIGS. 1-8 as illustrated or described herein may be combined with one or more other portions of another of FIGS. 1-8. For example, one or more elements of the method 500 of FIG. 5 may be performed in combination with other operations described herein. Accordingly, no single implementation described herein should be construed as limiting and implementations of the disclosure may be suitably combined without departing from the teachings of the disclosure. As an example, one or more operations described with reference to FIGS. 1-8 may be optional, may be performed at least partially concurrently, and/or may be performed in a different order than shown or described.

Aspects of the disclosure are described further with reference to the following set of interrelated clauses:

Clause 1 includes an aircraft including a plurality of stereo cameras; one or more processors; and one or more memory devices storing instructions that are executable by the one or more processors to perform operations including: generating a three-dimensional depth map based on a plurality of outputs of the plurality of stereo cameras; detecting one or more objects represented in the plurality of outputs; and transmitting one or more taxi control signals based on the three-dimensional depth map and the one or more objects.

Clause 2 includes the aircraft of Clause 1 wherein the operations further include receiving a user input identifying a particular taxi waypoint, wherein the one or more taxi control signals are further generated based on the particular taxi waypoint.

Clause 3 includes the aircraft of any of Clause 2 wherein the operations further include automatically ceasing transmitting the one or more taxi control signals responsive to a determination that the aircraft has arrived at the particular taxi waypoint.

Clause 4 includes the aircraft of any of Clause 1 to 3 further including an auto-tiller system, wherein at least one of the one or more taxi control signals is transmitted to the auto-tiller system.

Clause 5 includes the aircraft of any of Clause 1 to 4 wherein the one or more memory devices further store one or more machine-learning models executable by the one or more processors to identify the one or more objects based on the plurality of outputs.

Clause 6 includes the aircraft of Clause 5 wherein the one or more machine-learning models are trained to identify the one or more objects independent of a location of the one or more objects.

Clause 7 includes the aircraft of any of Clause 1 to 6 wherein the one or more memory devices further store one or more machine-learning models executable by the one or more processors to identify, based on the plurality of outputs, airport signs and markings, wherein the one or more taxi control signals are generated based at least in part on a distance to one or more identified signs or markings.

Clause 8 includes the aircraft of any of Clause 1 to 7 further including a communications interface, wherein the communications interface is configured to receive traffic management signals indicating taxi clearance, wherein the one or more taxi control signals are further generated based on the traffic management signals.

Clause 9 includes the aircraft of any of Clause 1 to 8 wherein the plurality of stereo cameras include a first stereo camera on an exterior of a flightdeck of the aircraft and a second stereo camera proximate a horizontal stabilizer of the aircraft, wherein the first stereo camera is configured to capture a first field of view along a direction corresponding to forward translation of the aircraft, and wherein the second stereo camera is configured to capture a second field of view along a direction corresponding to rotation of the aircraft about a yaw axis.

Clause 10 includes the aircraft of any of Clause 1 to 8 wherein the plurality of stereo cameras includes a first stereo camera on an inboard leading edge of a wing of the aircraft and a second stereo camera on an outboard edge of the wing.

Clause 11 includes the aircraft of any of Clause 1 to 8 wherein the plurality of stereo cameras includes a first stereo camera on an exterior of a flightdeck of the aircraft and a second stereo camera on a wing of the aircraft.

Clause 12 includes the aircraft of Clause 11 wherein the operations further comprise identifying potential collisions based on the three-dimensional depth map, wherein the one or more processors are configured to identify a first object having a first height as a potential collision hazard responsive to the first object being represented in a first output of the first stereo camera, and wherein the one or more processors are configured to not identify a second object having the first height as a potential collision hazard responsive to the second object being represented in a second output of the second stereo camera.

Clause 13 includes the aircraft of any of Clause 1 to 8 wherein the plurality of stereo cameras includes a first stereo camera on an exterior of a flightdeck of the aircraft, a second stereo camera on an inboard portion of a first wing of the aircraft, a third stereo camera on an outboard portion of the first wing, a fourth stereo camera on an inboard portion of a second wing of the aircraft, a fifth stereo camera on an outboard portion of the second wing, a sixth stereo camera on a vertical stabilizer of the aircraft, a first group of stereo cameras on a first side of a fuselage of the aircraft, and a second group of stereo cameras on a second side of the fuselage, wherein the first side and the second side are opposite from each other.

Clause 14 includes the aircraft of Clause 13 wherein the first group of stereo cameras includes a seventh stereo camera proximate to a nose of the aircraft, an eighth stereo camera proximate to a horizontal stabilizer of the aircraft, and a ninth stereo camera positioned between the seventh stereo camera and the eighth stereo camera.

Clause 15 includes the aircraft of any of Clause 1 to 14 wherein the operations further include generating a warning signal responsive to the three-dimensional depth map indicating that an object is within a first threshold distance.

Clause 16 includes the aircraft of Clause 15 wherein the operations further include ceasing transmitting the one or more taxi control signals responsive to the three-dimensional depth map indicating that an object is within a second threshold distance.

Clause 17 includes a method including generating a three-dimensional depth map based on a plurality of outputs of a plurality of stereo cameras coupled to an aircraft; detecting one or more objects represented in the plurality of outputs; and transmitting one or more taxi control signals based on the three-dimensional depth map and the one or more objects.

Clause 18 includes the method of Clause 17 further including: receiving traffic management signals indicating a particular taxi waypoint; and receiving user input indicating acceptance of the particular taxi waypoint, wherein the one or more taxi control signals are generated based on the particular taxi waypoint responsive to the user input.

Clause 19 includes a computer-readable storage device that stores instructions that are executable by one or more processors to perform operations including: generating a three-dimensional depth map based on a plurality of outputs of a plurality of stereo cameras coupled to an aircraft; detecting one or more objects represented in the plurality of outputs; and transmitting one or more taxi control signals based on the three-dimensional depth map and the one or more objects.

Clause 20 includes the computer-readable storage device of Clause 19 wherein the operations further comprise receiving positioning signals from a communications interface, wherein the one or more taxi control signals are further generated based on the positioning signals.

Examples described above are illustrative and do not limit the disclosure. It is to be understood that numerous modifications and variations are possible in accordance with the principles of the present disclosure.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An aircraft comprising:
   a plurality of stereo cameras including a first stereo camera and a second stereo camera at different locations on the aircraft;
   one or more processors;
   one or more memory devices storing instructions that are executable by the one or more processors to perform operations comprising:
     generating a three-dimensional depth map based on a plurality of outputs of the plurality of stereo cameras;
     detecting one or more objects represented in the plurality of outputs;
     identifying potential collision hazards based on the three-dimensional depth map, wherein the one or more processors are configured to identify a first object having a first height as a potential collision hazard responsive to the first object being represented in a first output of the first stereo camera, and wherein the one or more processors are configured to not identify a second object having the first height as a potential collision hazard responsive to the second object being represented in a second output of the second stereo camera; and
     transmitting one or more taxi control signals based on the three-dimensional depth map and the one or more objects; and
   an auto-tiller system, wherein at least one of the one or more taxi control signals is transmitted to the auto-tiller system.

2. The aircraft of claim 1, wherein the operations further comprise receiving user input identifying a particular taxi waypoint, and wherein the one or more taxi control signals are further generated based on the particular taxi waypoint.

3. The aircraft of claim 2, wherein the operations further comprise automatically ceasing transmitting the one or more taxi control signals responsive to a determination that the aircraft has arrived at the particular taxi waypoint.

4. The aircraft of claim 1, wherein the operations further comprise:
receiving traffic management signals indicating a particular taxi waypoint; and
receiving user input indicating acceptance of the particular taxi waypoint, wherein the one or more taxi control signals are generated based on the particular taxi waypoint responsive to the user input.

5. The aircraft of claim 1, wherein the one or more memory devices further store one or more machine-learning models executable by the one or more processors to identify the one or more objects based on the plurality of outputs.

6. The aircraft of claim 5, wherein the one or more machine-learning models are trained to identify the one or more objects independent of a location of the one or more objects.

7. The aircraft of claim 1, wherein the one or more memory devices further store one or more machine-learning models executable by the one or more processors to identify, based on the plurality of outputs, airport signs and markings, wherein the one or more taxi control signals are generated based at least in part on a distance to one or more identified signs or markings.

8. The aircraft of claim 1, further comprising a communications interface, wherein the communications interface is configured to receive traffic management signals indicating taxi clearance, wherein the one or more taxi control signals are further generated based on the traffic management signals.

9. The aircraft of claim 1, wherein the plurality of stereo cameras include a third stereo camera on an exterior of a flightdeck of the aircraft and a fourth stereo camera proximate a horizontal stabilizer of the aircraft, wherein the third stereo camera is configured to capture a first field of view along a direction corresponding to forward translation of the aircraft, and wherein the fourth stereo camera is configured to capture a second field of view along a direction corresponding to rotation of the aircraft about a yaw axis.

10. The aircraft of claim 1, wherein the plurality of stereo cameras includes a third stereo camera on an inboard leading edge of a wing of the aircraft and a fourth stereo camera on an outboard edge of the wing.

11. The aircraft of claim 1, wherein the first stereo camera is located on an exterior of a flightdeck of the aircraft and the second stereo camera is located on a wing of the aircraft.

12. The aircraft of claim 1, wherein the operations further comprise receiving positioning signals from a communications interface, and wherein the one or more taxi control signals are further generated based on the positioning signals.

13. The aircraft of claim 1, wherein the first stereo camera is located on an exterior of a flightdeck of the aircraft, wherein the plurality of stereo cameras includes, a third stereo camera on an outboard portion of a first wing, a fourth stereo camera on an inboard portion of a second wing of the aircraft, a fifth stereo camera on an outboard portion of the second wing, a sixth stereo camera on a vertical stabilizer of the aircraft, a seventh stereo camber on an inboard portion of the first wing of the aircraft, a first group of stereo cameras on a first side of a fuselage of the aircraft, and a second group of stereo cameras on a second side of the fuselage, and wherein the first side and the second side are opposite from each other.

14. The aircraft of claim 13, wherein the first group of stereo cameras includes an eighth stereo camera proximate to a nose of the aircraft, a ninth stereo camera proximate to a horizontal stabilizer of the aircraft, and a tenth stereo camera positioned between the eighth stereo camera and the ninth stereo camera.

15. The aircraft of claim 1, wherein the operations further comprise generating a warning signal responsive to the three-dimensional depth map indicating that a first object of the one or more objects is within a first threshold distance.

16. The aircraft of claim 15, wherein the operations further comprise ceasing transmitting the one or more taxi control signals responsive to the three-dimensional depth map indicating that the first object of the one or more objects is within a second threshold distance.

17. A method comprising:
generating a three-dimensional depth map based on a plurality of outputs of a plurality of stereo cameras coupled to an aircraft, the plurality of stereo cameras including a first stereo camera and a second stereo camera at different locations on the aircraft;
detecting one or more objects represented in the plurality of outputs;
identifying potential collision hazards based on the three-dimensional depth map, wherein a first object is identified as having a first height as a potential collision hazard responsive to the first object being represented in a first output of the first stereo camera, and wherein a second object is not identified as having the first height as a potential collision hazard responsive to the second object being represented in a second output of the second stereo camera; and
transmitting one or more taxi control signals based on the three-dimensional depth map and the one or more objects, wherein at least one of the one or more taxi control signals is transmitted to an auto-tiller system for the aircraft.

18. The method of claim 17, further comprising:
receiving traffic management signals indicating a particular taxi waypoint; and
receiving user input indicating acceptance of the particular taxi waypoint, wherein the one or more taxi control signals are generated based on the particular taxi waypoint responsive to the user input.

19. A computer-readable storage device storing instructions that are executable by one or more processors to perform operations comprising:
generating a three-dimensional depth map based on a plurality of outputs of a plurality of stereo cameras coupled to an aircraft including a first stereo camera and a second stereo camera at different locations of the aircraft;
detecting one or more objects represented in the plurality of outputs;
identifying potential collision hazards based on the three-dimensional depth map, wherein a first object is identified as having a first height as a potential collision hazard responsive to the first object being represented in a first output of the first stereo camera, and wherein a second object is not identified as having the first height as a potential collision hazard responsive to the second object being represented in a second output of the second stereo camera; and
transmitting one or more taxi control signals based on the three-dimensional depth map and the one or more objects, wherein at least one of the one or more taxi control signals is transmitted to an auto-tiller system for the aircraft.

20. The computer-readable storage device of claim 19, wherein the operations further comprise receiving positioning signals from a communications interface, wherein the one or more taxi control signals are further generated based on the positioning signals.

\* \* \* \* \*